3,268,515
AMINO-ACYLAMINO-ACYLAMINO-
PENICILLANIC ACIDS
Harvey E. Alburn, West Chester, and Norman H. Grant, Wynnewood, Pa., assignors to American Home Products Corporation, New York, N.Y., a corporation of Delaware
No Drawing. Filed Apr. 7, 1964, Ser. No. 358,066
18 Claims. (Cl. 260—239.1)

This invention relates to new synthetic penicillins having patent activity against Gram-negative and Gram-positive microorganisms.

In our copending patent application Serial No. 353,574, filed March 20, 1964, and of which the present application is a continuation-in-part, there is disclosed a novel method for preparing amino-acylamino-acylamino-penicillanic derivatives.

With the use of the method described in the said copending application, there has now been discovered a series of new penicillianic acid derivatives having the formula:

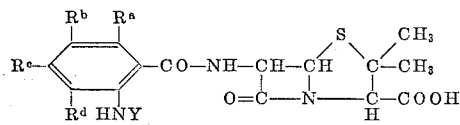

where $R^a$, $R^b$, $R^c$ and $R^d$ are of the group consisting of hydrogen alkyl, nitro, sulfo, amino, halo and hydroxy;

$R^a$ and $R^b$, $R^b$ and $R^c$ or $R^c$ and $R^d$, when respectively joined, complete a ring of the group consisting of aryl and alicyclic; and Y is of the group consisting of:

(1)

$$R^1\text{—CH—CO—}$$
$$|$$
$$NH$$
$$|$$
$$R^2$$

where $R^1$ is of the group consisting of hydrogen, alkyl, substituted alkyl, aryl, substituted aryl, alkaryl, and substituted alkaryl; and $R^2$ is of the group consisting of alkyl and aryl;

(2)

where $n=2$ to 9;

(3)

where $R^1$, $R^2$, $R^3$, and $R^4$ are of the group consisting of hydrogen, alkyl, nitro, sulfo, amino, halo and hydroxy;

$R^1$ and $R^2$, $R^2$ and $R^3$, $R^3$ and $R^4$, when respectively joined, complete a ring of the group consisting of aryl and alicyclic; and $R^5$ is of the group consisting of hydrogen and lower alkyl;

(4)

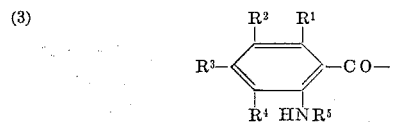

where $R^1$, $R^2$, $R^3$ and $R^4$ are of the group consisting of hydrogen, alkyl, hydroxy, alkoxy, halo, amino and nitro;

(5)

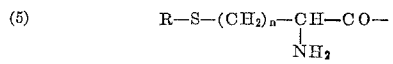

where $n=1$ to 5, and R is of the group consisting of (a) hydrogen, alkyl, and (b)

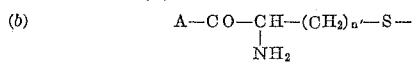

in which case A is a second residue of the penicillanic acid derivative of Formula I above, and $n'=1$ to 5;

(6)

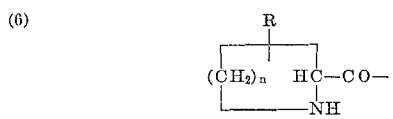

where R is of the group consisting of hydroxy and alkyl, and $n=2$ to 7; and (7)

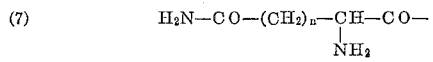

where $n=1$ to 4.

The new compounds of the series defined above show desirable broad spectrum antibacterial activity and are useful as therapeutic agents in poultry and mammals, including man, in the treatment of infectious diseases caused by Gram-positive and Gram-negative bacteria, upon either parenteral or oral administration. They also have use as nutritional supplements in animal feed.

The general process for preparing the aforesaid novel amino - acylamino - acylamino - penicillanic acids is described and claimed in said copending application and comprises generally the reaction of a 4-substituted-2,5-oxazolidinedione (also known as an N-carboxy-amino acid anhydride) with a 6-(amino-acylamino)penicillanic acid under controlled conditions. Methods for the preparation of the N-carboxy amino acid anhydride and 6-(amino-acylamino)penicillanic acid reactants suitable for use in the process are also described in or referred to in said copending application.

In a preferred method for preparing the amino-acylamino-acylamino-penicillanic acids of the present invention, the 4-substituted-2,5-oxazolidinedione chosen is reacted with the selected 6-(α-amino-acylamino)penicillanic acid in approximately equimolar quantities in a cold aqueous solution in a pH range from about 3.8 to about 7.4 and preferably in the range 4.7–7.0. The mixture is stirred for several hours at a temperature from just above the freezing point of the aqueous mixture to about 37° C., and preferably in the range 0–10° C. Although not essential, it may be preferred to include a buffer having an ionic strength of about 0.02, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like.

The following examples are illustrative of the invention, but are not to be considered necessarily limitative thereof.

EXAMPLE I

6-[o-(2-amino-2-phenylacetamido)benzamido]penicillanic acid

Mix 404 mg. (1.2 millimoles) of 6-(o-aminobenzamido)penicillanic acid with 212 mg. (1.2 millimoles) of D-phenylglycine-N-carboxyanhydride in 30 ml. of ice-cold water. Stir at 1–2° for 60 minutes, keeping the pH at 6.0 by the addition of 1 N NaOH. Filter, and freeze-dry the filtrate. The product is active against *Staph. aureus* and *E. coli*.

EXAMPLE II

*6-[2-(D-2-amino-4-methylvaleramido)-5-nitrobenzamido]penicillanic acid*

Mix 304 mg. (0.8 millimole) of 6-(2-amino-5-nitrobenzamido)penicillanic acid with 126 mg. (0.8 millimole) of the N-carboxyanhydride of D-leucine in 20 ml. of ice-cold water. Stir at 1–2° for 60 minutes, keeping the pH at 6.0 by the addition of 1 N NCl. Filter, and freeze-dry the filtrate. The product is active against both *Staph. aureus* and *E. coli*.

EXAMPLE III

When in the procedure of Example II, the N-carboxyanhydride of D-leucine is replaced by 0.8 millimole of the N-carboxyanhydride of (1) D-phenylglycine
(2) L-phenylalanine
(3) 1-aminocyclobutane carboxylic acid
(4) 1-aminocyclopentane carboxylic acid
(5) 1-aminocyclohexane carboxylic acid
(6) 1-aminocyclooctane carboxylic acid
(7) anthranilic acid
(8) 2-amino-5-nitrobenzoic acid
(9) 2-amino-5-chlorobenzoic acid
(10) D-tryptophan
(11) L-tryptophan
(12) DL-phenylsarcosine
(13) L-cystine
(14) glycine respectively, the following corresponding penicillin derivatives, all active against Gram-positive and Gram-negative microorganisms, are produced:

(1) 6 - [2 - (D - 2 - amino - 2 - phenylacetamido) - 5-nitrobenzamido]penicillanic acid
(2) 6 - [2 - (L - 2 - amino - 3 - phenylpropionamido)-5-nitrobenzamido]penicillanic acid
(3) 6 - [2 - (1 - aminocyclobutanecarboxamido) - 5-nitrobenzamido]penicillanic acid
(4) 6 - [2 - (1 - aminocyclopentanecarboxamido) - 5-nitrobenzamido]penicillanic acid
(5) 6 - [2 - (1 - aminocyclohexanecarboxamido) - 5-nitrobenzamido]penicillanic acid
(6) 6 - [2 - (1 - aminocyclooctanecarboxamido) - 5-nitrobenzamido]penicillanic acid
(7) 6 - [2 - (2 - aminobenzamido) - 5 - nitrobenzamido]penicillanic acid
(8) 6 - [2 - (2 - amino - 5 - nitrobenzamido) - 5 - nitrobenzamido]penicillanic acid
(9) 6 - [2 - (2 - amino - 5 - chlorobenzamido) - 5 - nitrozenzamido]penicillanic acid
(10) 6 - [2 - (D - α - aminoindole - 3 - propionamido)-5-nitrobenzamido]penicillanic acid
(11) 6 - [2 - (L - α - aminoindole - 3 - propionamido)-5-nitrobenzamido]penicillanic acid
(12) 6 - [2 - (DL - 2 - methylamino - 2 - phenylacetamido)-5-nitrobenzamido]penicillanic acid
(13) bis[6 - (2 - [L - 3 - thio - 2 - aminopropionamido]-5-nitrobenzamido)penicillanic acid]
(14) 6 - [1 - (2 - aminoacetamido) - 5 - nitrobenzamido]penicillanic acid

EXAMPLE IV

When in the procedure of Example I, the N-carboxyanhydride of D-phenylglycine is replaced by 1.2 millimoles of the N-carboxyanhydride of (1) 1-aminocyclopropanecarboxylic acid
(2) 1-aminocyclodecanecarboxylic acid
(3) 2-amino-3-naphthoic acid
(4) 2-methylamino-5-nitrobenzoic acid
(5) L-α-amino-5-methylindole-3-propionic acid
(6) L-α-amino-5-ethylindole-3-propionic acid
(7) L-α-amino-5-methoxyindole-3-propionic acid
(8) D-2-amino-3-(ethylthio)-propionic acid
(9) DL-2-amino-3-(methylthio)-propionic acid
(10) DL-2-amino-7-(methylthio)-heptanoic acid
(11) D-ethionine
(12) DL-2-ethylamino-2-phenylglycine
(13) DL-2-amylamino-2-phenylglycine
(14) 2-carboxytrimethyleneimine
(15) 2-carboxyoctamethyleneimine the corresponding penicillin derivatives, all active against Gram-positive and Gram-negative microorganisms, are produced.

EXAMPLE V

When in the procedure of Example I, the 6-(o-aminobenzamido)penicillanic acid is replaced by 1.2 millimoles of 6-(2-amino-3-naphthamido)penicillanic acid, the corresponding penicillin product, active against *Staph. aureus* and *E. coli*, is produced.

EXAMPLE VI

When in the procedure of Example I, the 6-(o-aminobenzamido)penicillanic acid is replaced by 1.2 millimoles of 6 - (N - methyl - 2 - amino - 5 - nitrobenzamido)penicillanic acid, the corresponding penicillin product, active against *Staph. aureus* and *E. coli*, is produced.

As will be understood by those skilled in the art, the compounds of the invention may be utilized in their acid form or in the form of the therapeutically-active salts thereof, e.g., the sodium or potassium salts, or hydrochloride, etc., or in the form of the pharmaceutically-acceptable acid-addition salts prepared by the reaction of the penicillin compounds with an amine or diamine base, e.g., procaine, or various N,N'-disubstituted alkylenediamines, such as N,N'-dibenzylethylene-diamine, etc.

We claim:
1. A compound of the formula:

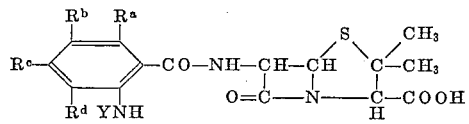

where
$R^a$, $R^b$, $R^c$ and $R^d$ are of the group consisting of hydrogen, alkyl, sulfo, nitro, and chloro;
$R^a$ and $R^b$, when joined complete an aryl ring; and
Y is of the group consisting of:

(1)

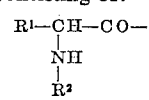

wherein
$R^1$ is of the group consisting of hydrogen, lower alkyl, phenyl, (lower)alkylphenyl, (lower)alkoxyphenyl, aminophenyl, nitrophenyl, chlorophenyl, indolo (lower)alkyl, (lower)alkylindolo(lower)alkyl, and (lower)alkoxyindolo(lower)alkyl; and
$R^2$ is of the group consisting of hydrogen, lower alkyl, and phenyl;

(2)

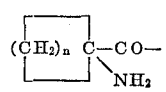

where $n=2$ to 9;

(3)

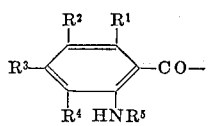

wherein:
$R^1$, $R^2$, $R^3$, and $R^4$ are of the group consisting of hydrogen, alkyl, sulfo, nitro and chloro;

R¹ and R² when joined complete a naphthylene ring; and

R⁵ is of the group consisting of hydrogen and alkyl;

(4) 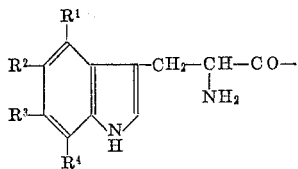

where
R¹, R², R³, and R⁴ are of the group consisting of hydrogen, lower alkyl and lower alkoxy;

(5) 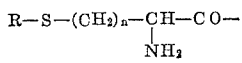

wherein $n=1$ to 5, and
R is of he group consisting of hydrogen and lower alkyl;

(6) 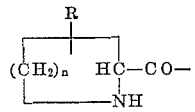

where
R is of the group consisting of hydroxy and alkyl, $n=2$ to 7; and (7) 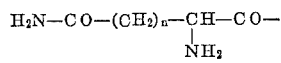

where $n=1$ to 2.

2. 6-[o-(2-amino - 2 - phenylacetamido)benzamido]-penicillanic acid.

3. 6-[2-(D-2-amino - 4-methylvaleramido) - 5-nitrobenzamido]penicillanic acid.

4. 6-[2-(2-amino - 5-methylbenzamido) - benzamido]-penicillanic acid.

5. 6-[2-(2 - pyrrolidinecarboxamido)benzamido]penicillanic acid.

6. 6-[2-(L-2-aminopropionamido) - benzamido]penicillanic acid.

7. 6-[2-(D-2-amino - 2-phenylacetamido) - 5-nitrobenzamido]penicillanic acid.

8. 6-[2-(L-2-amino - 3-phenylpropionamido) - 5-nitrobenzamido]penicillanic acid.

9. 6-[2-(1 - aminocyclobutanecarboxamido) - 5-nitrobenzamido]penicillanic acid.

10. 6-[2-(1-aminocyclopentanecarboxamido) - 5-nitrobenzamido]penicillanic acid.

11. 6-[2-(1-aminocyclohexanecarboxamido) - 5-nitrobenzamido]penicillanic acid.

12. 6-[2-(1-aminocyclooctanecarboxamido) - 5-nitrobenzamido]penicillanic acid.

13. 6-[2-(o-aminobenzamido) - 5 - nitrobenzamido]penicillanic acid.

14. 6-[2-(2-amino - 5-nitrobenzamido) - 5-nitrobenzamido]penicillanic acid.

15. 6-[2-(2-amino - 5-chlorobenzamido) - 5-nitrobenzamido]penicillanic acid.

16. 6-[2-(2-amino - 5-methylbenzamido) - 5-nitrobenzamido]penicillanic acid.

17. 6-[2-(D-α-aminoindole - 3-propionamido)-5-nitrobenzamido]penicillanic acid.

18. 6-[2-(L-α-aminoindole - 3-propionamido) - 5-nitrobenzamido]penicillanic acid.

References Cited by the Examiner
UNITED STATES PATENTS 2,951,839  9/1960  Doyle et al. _____ 260—239.1

ALEX MAZEL, *Primary Examiner.*

HENRY R. JILES, *Examiner.*

JAMES W. ADAMS, JR., *Assistant Examiner.*